United States Patent
Eguchi

(10) Patent No.: US 10,649,103 B2
(45) Date of Patent: May 12, 2020

(54) PORTABLE RADIOGRAPHIC IMAGE CAPTURING APPARATUS

(71) Applicant: FUJIFILM Corporation, Tokyo (JP)

(72) Inventor: Koichi Eguchi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/641,067

(22) Filed: Jul. 3, 2017

(65) Prior Publication Data

US 2017/0307769 A1   Oct. 26, 2017

Related U.S. Application Data

(63) Continuation of application No. 15/057,319, filed on Mar. 1, 2016, now Pat. No. 9,823,365, which is a continuation of application No. 14/633,202, filed on Feb. 27, 2015, now Pat. No. 9,702,989.

(30) Foreign Application Priority Data

Mar. 10, 2014   (JP) .................. 2014-046775

(51) Int. Cl.
| | | |
|---|---|---|
| G06T 1/20 | (2006.01) | |
| G01T 7/00 | (2006.01) | |
| G01T 1/20 | (2006.01) | |
| G01T 1/16 | (2006.01) | |
| G01T 1/161 | (2006.01) | |

(52) U.S. Cl.
CPC ............. *G01T 7/00* (2013.01); *G01T 1/16* (2013.01); *G01T 1/161* (2013.01); *G01T 1/2018* (2013.01)

(58) Field of Classification Search
CPC .. G01T 7/00; G01T 1/16; G01T 1/161; G01T 1/2018
See application file for complete search history.

(56) References Cited

U.S. PATENT DOCUMENTS

| 5,118,057 A | 6/1992 | Martin et al. |
|---|---|---|
| 8,844,883 B2 | 9/2014 | Tsutsumi |
| 2009/0101389 A1 | 4/2009 | Chirumbolo |
| (Continued) | | |

FOREIGN PATENT DOCUMENTS

| JP | 61-12131 U | 1/1986 |
|---|---|---|
| JP | 4-298099 A | 10/1992 |
| | (Continued) | |

OTHER PUBLICATIONS

Decision of Refusal issued in corresponding Japanese Patent Application No. 2014-046775 dated Jun. 27, 2017, with English language translation.

(Continued)

*Primary Examiner* — David P Porta
*Assistant Examiner* — Mamadou Faye
(74) *Attorney, Agent, or Firm* — Birch, Stewart, Kolasch & Birch, LLP

(57) ABSTRACT

A portable radiographic image capturing apparatus includes a radiation conversion panel configured to output image information on the basis of applied radiation, a casing housing the radiation conversion panel therein, and a plurality of support members on which the radiation conversion panel is supported in the casing. The support members have slot structures housing wires therein.

11 Claims, 11 Drawing Sheets

(56) References Cited

U.S. PATENT DOCUMENTS

| | | | |
|---|---|---|---|
| 2011/0024633 A1* | 2/2011 | Aoyagi | A61B 6/00 250/361 R |
| 2012/0074331 A1 | 3/2012 | Koyanagi | |
| 2013/0108301 A1 | 5/2013 | Momose et al. | |
| 2014/0016747 A1* | 1/2014 | Watanabe | A61B 6/56 378/62 |
| 2014/0183676 A1* | 7/2014 | Liu | G01T 1/2018 257/428 |

FOREIGN PATENT DOCUMENTS

| | | |
|---|---|---|
| JP | 5-4557 U | 1/1993 |
| JP | 7-281184 A | 10/1995 |
| JP | 2003-339112 A | 11/2003 |
| JP | 2009-058733 A | 3/2009 |
| JP | 2010-133724 A | 6/2010 |
| JP | 2011-064804 A | 3/2011 |
| JP | 2012-047627 A | 3/2012 |
| JP | 2014-020791 A | 3/2012 |
| JP | 2012-202735 A | 10/2012 |
| JP | 2012-239314 A | 12/2012 |
| JP | 2013-90397 A | 5/2013 |
| WO | 2011/024254 A1 | 3/2011 |

OTHER PUBLICATIONS

Japanese Office Action and English translation thereof, dated Nov. 22, 2016, for corresponding Japanese Application No. 2014-046775.
Machine English translation of JP-2010-133724A.
Non-Final Office Action dated Jan. 21, 2016, issued in U.S. Appl. No. 14/633,202.
U.S. Office Action, dated Aug. 19, 2016, for U.S. Appl. No. 14/633,202.
U.S. Office Action, dated Aug. 30, 2016, for U.S. Appl. No. 15/057,319.
U.S. Office Action, dated Mar. 9, 2017, for U.S. Appl. No. 15/057,319.
U.S. Office Action dated Apr. 26, 2016 for U.S. Appl. No. 14/633,202.
Japanese Office Action issued in corresponding Japanese Patent Application No. 2014-046775 dated Aug. 7, 2018.
Chinese Office Action and Search Report, dated Sep. 4, 2018, for corresponding Chinese Patent Application No. 201510089104.9, with English translation.

* cited by examiner

PORTABLE RADIOGRAPHIC IMAGE CAPTURING APPARATUS

CROSS-REFERENCE TO RELATED APPLICATION

This application is a continuation application of Ser. No. 15/057,319, filed Mar. 1, 2016, which is a continuation application of Ser. No. 14/633,202, filed Feb. 27, 2015, which claims priority under 35 U.S.C. 119(a) to Japanese Patent Application No. 2014-046775 filed on Mar. 10, 2014, all of which are hereby expressly incorporated by reference into the present application in their entirety.

BACKGROUND OF THE INVENTION

Field of the Invention

The present invention relates to a portable radiographic image capturing apparatus that includes a radiation conversion panel for outputting image information on the basis of applied radiation, a casing that houses the radiation conversion panel, and support members that support the radiation conversion panel in the casing.

Description of the Related Art

Japanese Laid-Open Patent Publication No. 2012-202735, for example, discloses a portable radiographic image capturing apparatus for detecting radiation that has passed through a subject using a radiation conversion panel housed in a casing, converting the detected radiation into image information, and outputting the image information.

Japanese Laid-Open Patent Publication No. 2012-202735 discloses that the radiation conversion panel and a base plate are supported by support members, which are erected in the casing from the bottom plate toward the top plate of the casing. Further, plural circuit boards are fixed to the lower surface of the base plate, so that the circuit boards remain protected.

SUMMARY OF THE INVENTION

In the casing, the circuit boards are interconnected by harnesses (or wires) that are secured in position by clamps. One problem with the casing concerns the difficulty encountered in case that the harnesses are laid out within the limited space in the casing. Furthermore, the casing becomes unduly deformed on impact in case that the portable radiographic image capturing apparatus is accidentally dropped onto the floor while in use, or under an external load applied in excess of an allowable level. In such a case the casing may cause the harnesses to become broken or disconnected.

An object of the present invention is to provide a portable radiographic image capturing apparatus, which prevents wires from becoming broken or disconnected in a casing, and which allows the wires to be laid out easily inside the casing.

According to the present invention, a portable radiographic image capturing apparatus is provided including a radiation conversion panel for outputting image information on the basis of applied radiation, a casing housing the radiation conversion panel therein, and a plurality of support members on which the radiation conversion panel is supported in the casing.

To achieve the above object, according to the present invention, the support members have slot structures housing wires therein.

According to the present invention, the wires are housed in the slot structures, which are defined as gaps in the support members. The support members serve to support the radiation conversion panel in the casing, and also bear an external load applied thereto, e.g., a pressure exerted from the body of a subject. Since the wires are housed in the slot structures, even in case that the casing is deformed under external forces, the passageways for the wires are prevented from becoming narrowed, and the wires are prevented from being deformed. Thus, the wires that are housed in the slot structures are prevented from becoming broken or disconnected, even in case that the wires are subjected to external loads and/or vibrations.

Further, since the wires are housed in the slot structures, members for clamping the wires are not required. As a result, the slot structures allow the wires to be laid out with ease, and are effective in reducing space.

The portable radiographic image capturing apparatus further includes a plurality of boards housed in the casing. The wires may be connected to regions of the boards, and the wires may be connected through the slot structures to other regions of the boards or to the radiation conversion panel.

The portable radiographic image capturing apparatus may further include a plurality of teeth, which are disposed in the support members and hold the wires within the slot structures. Such teeth make it unnecessary to use fixing parts, including clamps, tapes, etc., and make it less costly to secure the wires, since the number of locations where the wires are fixed is reduced.

In case that the teeth have respective surfaces made of an elastic material, the teeth do not damage the wires that are housed in the slot structures. In case that at least the corners of the teeth, which are positioned near the wires, are rounded as viewed in cross section along a plane normal to the longitudinal directions of the support members, then the wires are effectively prevented from becoming damaged.

In case that the slot structures extend along the longitudinal directions of the support members, and the teeth are disposed in a staggered layout along the longitudinal directions of the support members, then it is less likely for the wires to become dislodged from the slot structures.

In case that the support members are made of or contain an electrically conductive material, then the support members exhibit a shielding effect on the wires that are housed in the slot structures. More specifically, generation of noise is avoided in the case where the wires, which are housed in the slot structures, are vibrated. The shielding effect that is exhibited by the support members is effective to prevent noise from external electronic devices from being applied to the wires.

The slot structures may include crossing regions where other wires extend across the wires. The crossing regions preferably are provided by partially removing side walls of the support members that define the slot structures. The other wires extend across both the slot structures and the wires that are housed in the slot structures in the crossing regions, while in addition, the other wires are held between the wires, which are housed in the slot structures, and the casing or a base plate that is disposed in the casing.

The casing includes a front face to which the radiation conversion panel is fixed, and a rear face that is held in fitted engagement with the front face. The casing houses boards and a base plate therein, and the radiation conversion panel and the base plate are supported in the casing by the support members, which are erected from the rear face. The boards and the support members may be fixed to the front face by the base plate, or alternatively, the boards may be fixed to the rear face. In either case, since the boards and the support members are disposed on the same front or rear face, the wires can easily be connected to the boards.

The above and other objects, features, and advantages of the present invention will become more apparent from the following description in case that taken in conjunction with the accompanying drawings, in which preferred embodiments of the present invention are shown by way of illustrative example.

DESCRIPTION OF THE PREFERRED EMBODIMENTS

Portable radiographic image capturing apparatus according to preferred embodiments of the present invention will be described in detail below with reference to the accompanying drawings.

Structure of the Electronic Cassette

Figure 1:
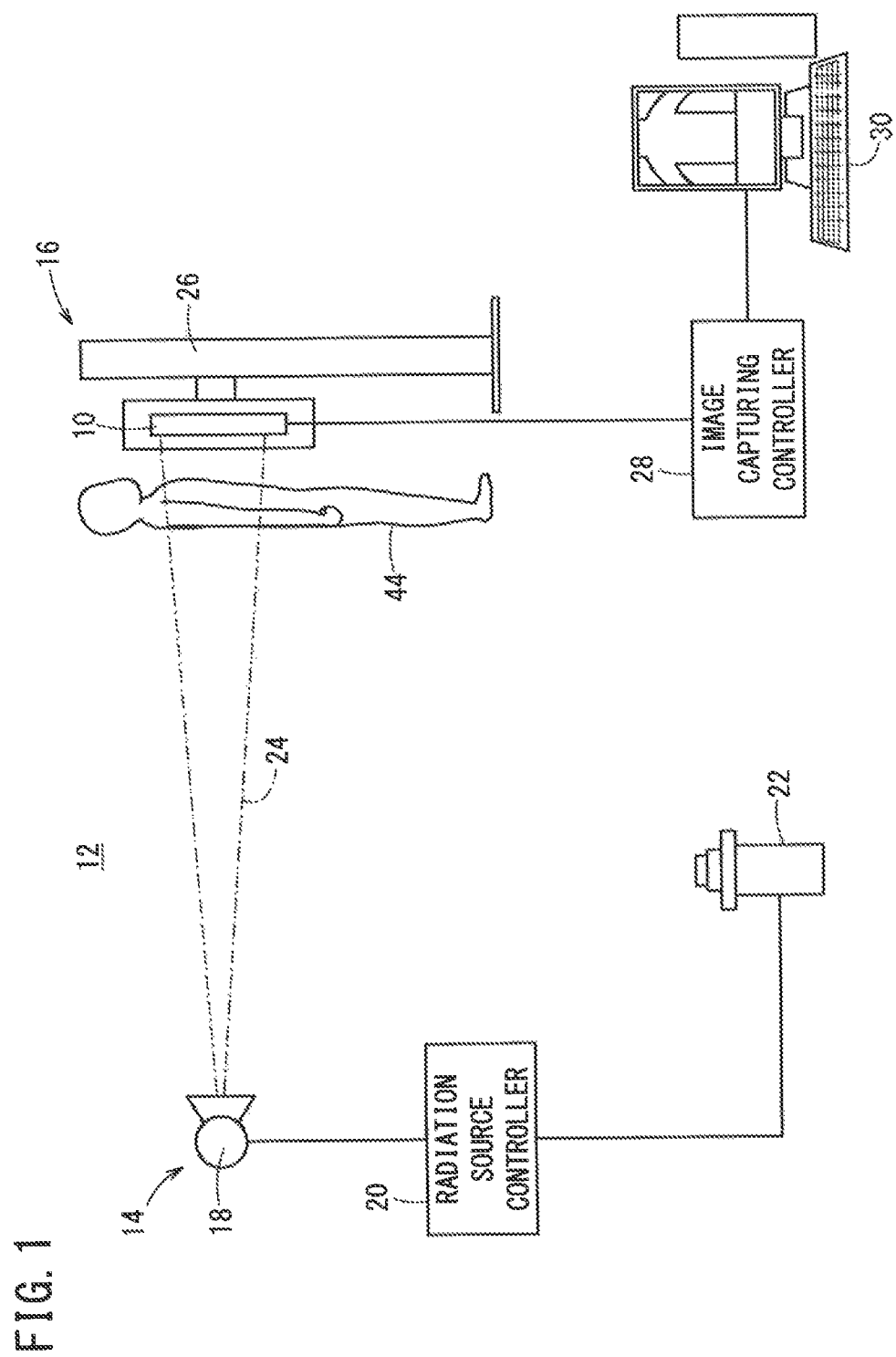
FIG. 1 is a schematic view showing a radiographic image capturing system incorporating an electronic cassette according to an embodiment of the present invention.

As shown in FIG. 1, an electronic cassette 10, which serves as a portable radiographic image capturing apparatus according to an embodiment of the present invention, is incorporated in a radiographic image capturing system 12. The radiographic image capturing system 12 is composed of a radiation generator 14 and an image capturing assembly 16.

The radiation generator 14 includes a radiation source 18, a radiation source controller 20 for controlling the radiation source 18, and an irradiation switch 22. The radiation source 18 has a radiation tube for outputting radiation 24, and a collimator for limiting an irradiation field of the radiation 24.

The radiation source controller 20 controls the radiation source 18 on the basis of a tube voltage, a tube current, and an irradiation time, which are included among prescribed image capturing conditions, so as to enable the radiation source 18 to emit radiation 24. The image capturing conditions may be set manually by the operator, typically a radiologist, who operates a control panel of the radiation source controller 20. Alternatively, the image capturing conditions may be set automatically by the image capturing assembly 16, and delivered through a communication cable.

The irradiation switch 22 is a two-step switch that is operated by the operator. By the operator pressing the irradiation switch 22, an operation signal is output to the radiation source controller 20 for controlling the radiation source 18. More specifically, in case that the irradiation switch 22 is pressed one step by the operator, the irradiation switch 22 outputs a warm-up start signal as a control signal to the radiation source controller 20, which starts to warm up the radiation source 18 in response to the supplied warm-up start signal. In case that the irradiation switch 22 is pressed two steps by the operator, the irradiation switch 22 outputs an irradiation start signal as a control signal to the radiation source controller 20, which starts to output radiation 24 from the radiation source 18 in response to the supplied irradiation start signal.

The image capturing assembly 16 includes the electronic cassette 10, an image capturing stand 26, an image capturing controller 28, and a console 30.

Figure 2:
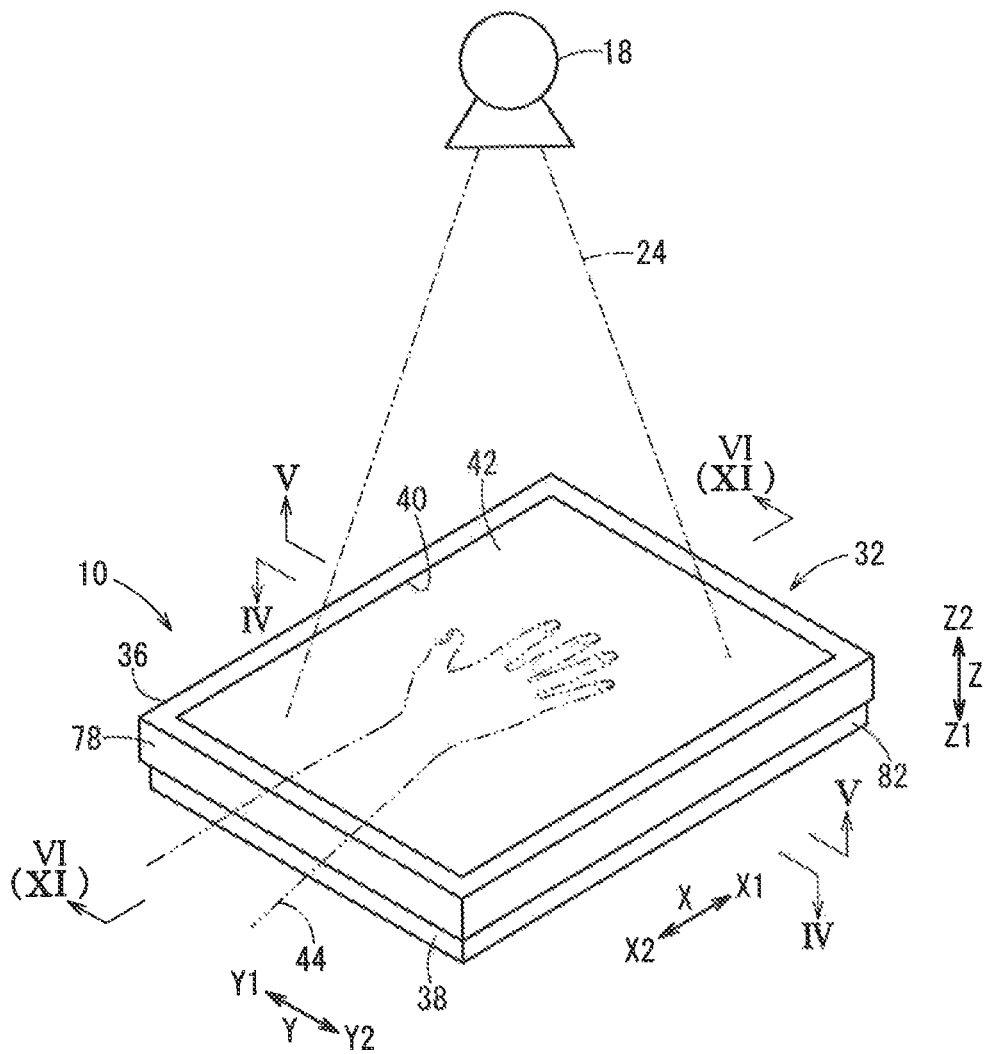
FIG. 2 is a perspective view of the electronic cassette shown in FIG. 1.
Figure 3:
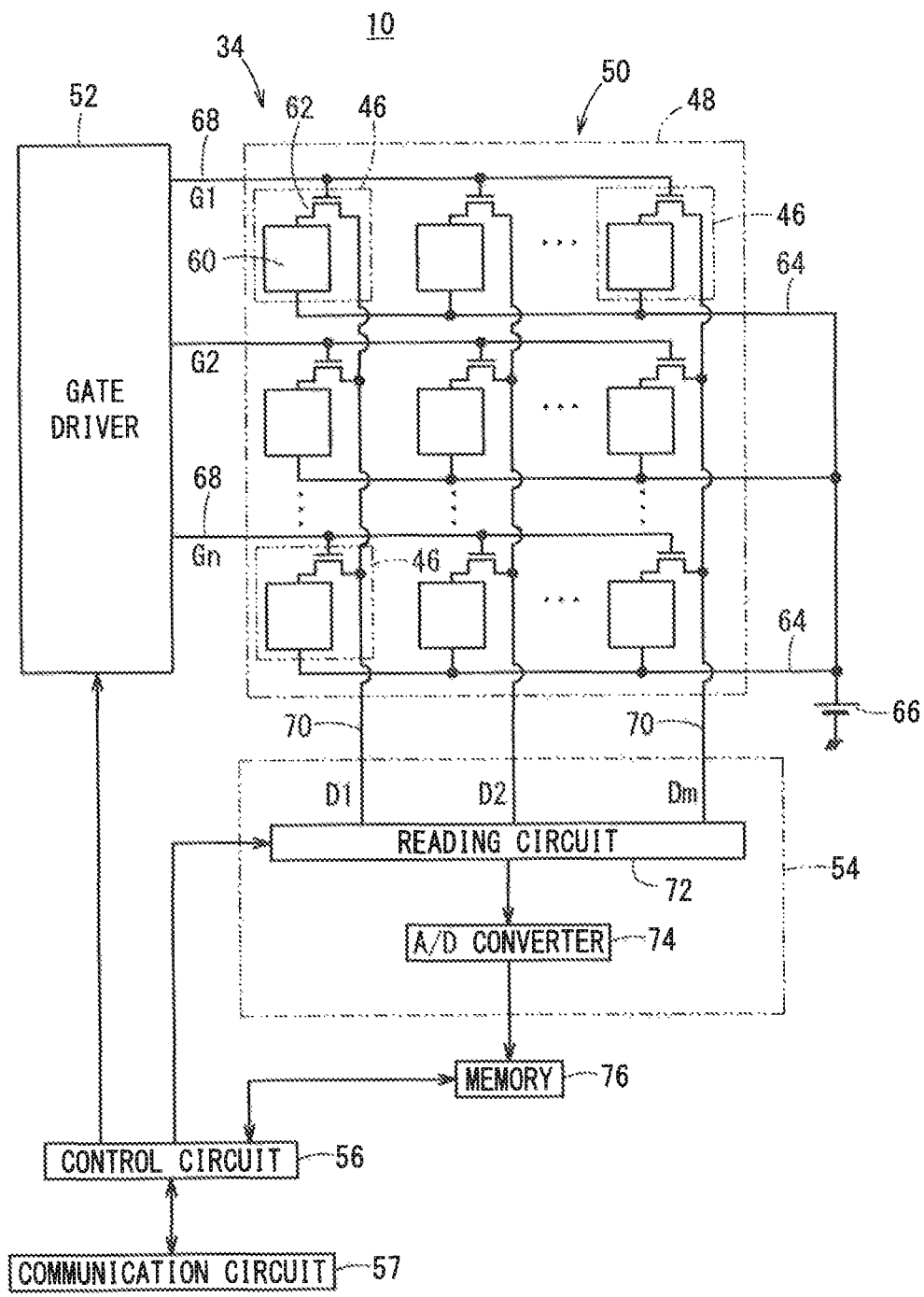
FIG. 3 is an electric block diagram of the electronic cassette shown in FIGS. 1 and 2.
Figure 4:
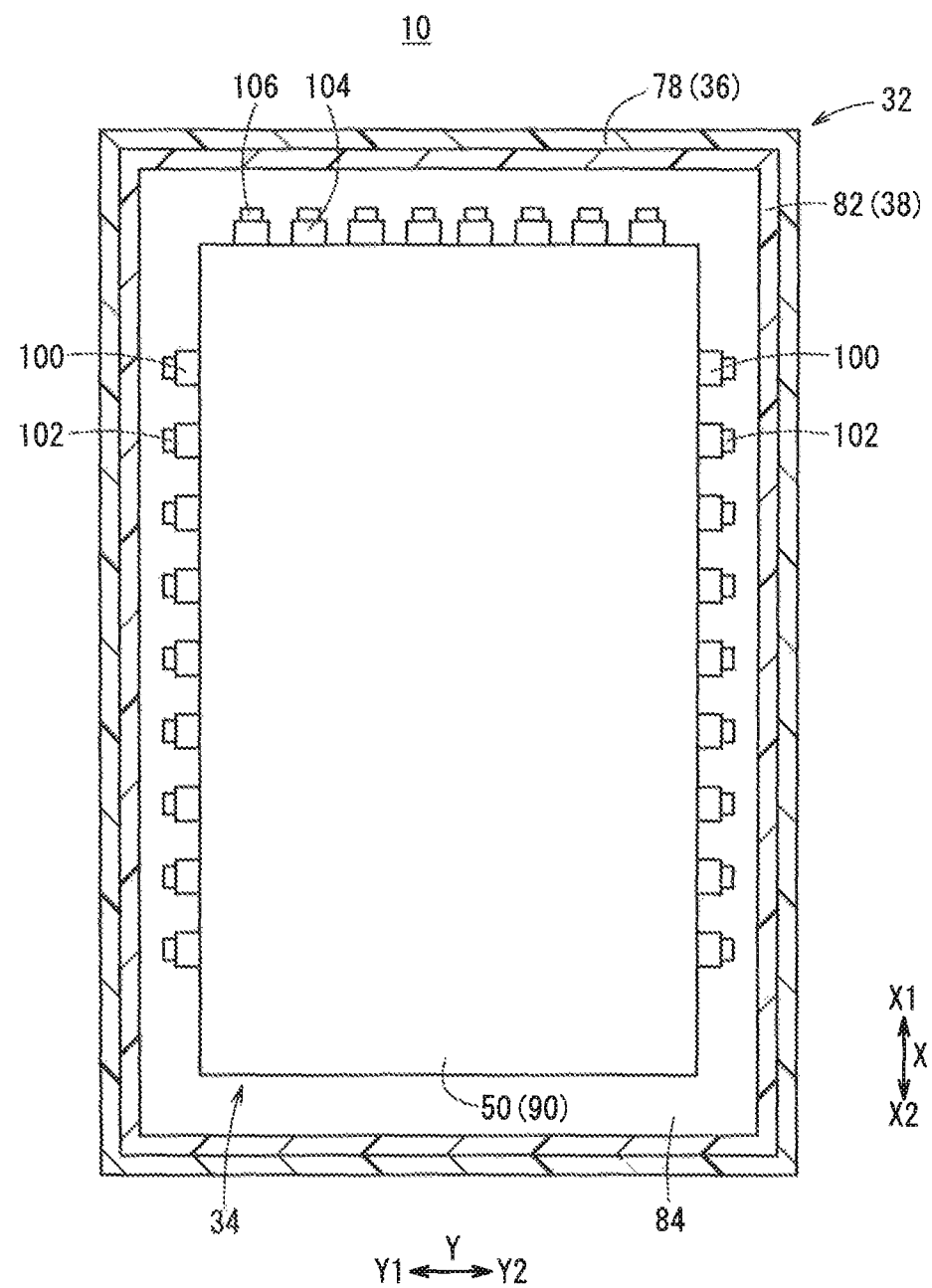
FIG. 4 is a cross-sectional view taken along line IV-IV of FIG. 2.

As shown in FIG. 2, the electronic cassette 10 has a flat box-shaped casing 32 that is permeable to applied radiation 24. As shown in FIGS. 3 and 4, the casing 32 houses therein a flat panel detector (FPD) 34 as an image detector. The casing 32 has a contoured shape, the size of which is in conformity with International Standard ISO4090:2001. Such a size is essentially similar to the sizes of cassettes for half-size (383.5 mm×459.5 mm) films or IPs, for example.

The casing 32 includes a front face 36 that is irradiated with radiation 24, and a rear face 38 that is fitted in the front face 36. The front face 36 has a rectangular opening 40 defined centrally therein. The opening 40 is fitted with a top plate 42, which is lightweight and highly rigid, and is made of carbon or a resin that is highly permeable to radiation 24. The radiation 24 is applied to the top plate 42.

The casing 32, which is lightweight as a whole, functions as an electromagnetic shield. More specifically, the portion of the casing 32 other than the top plate 42 preferably is made of an electrically conductive resin, for example. In case that the top plate 42 is made of a resin, the resin preferably is an electrically conductive resin. The casing 32, which is arranged in the foregoing manner, is capable of preventing electromagnetic noise from entering the electronic cassette 10, and also prevents electromagnetic noise from being radiated outside of the electronic cassette 10.

The image capturing stand 26 shown in FIG. 1 has a slot into which the electronic cassette 10 is removably inserted. In case that the electronic cassette 10 is inserted in the slot, the electronic cassette 10 is held by the image capturing stand 26, such that the top plate 42, which is irradiated with radiation 24, is oriented opposite to the radiation source 18. Since, as described above, the size of the casing 32 of the electronic cassette 10 is essentially similar to the sizes of film cassettes and IP cassettes, the electronic cassette 10 can be used on conventional image capturing stands that are used with film cassettes and IP cassettes.

In case that a subject 44, typically a patient, is imaged, the patient is placed upright between the radiation source 18 and the image capturing stand 26, and the radiation source 18 applies radiation 24 to the subject 44. As shown in FIG. 1, radiation 24 passes through the subject 44, and then passes through the top plate 42 to the FPD 34. The FPD 34 converts the applied radiation 24 into a radiographic image (image information) of the subject 44, and outputs the image information to the image capturing controller 28. In FIG. 1, the electronic cassette 10 is illustrated as operating in an upright image capturing mode. However, the electronic cassette 10 may also be applied to a recumbent image capturing mode, in which a radiographic image of a subject 44 who is lying in a recumbent position is captured.

The image capturing controller 28 is connected to the electronic cassette 10 for enabling wired or wireless communication to be carried out with the electronic cassette 10 in order to control the electronic cassette 10. In FIG. 1, the image capturing controller 28 is illustrated as being connected to the electronic cassette 10 for enabling wired communication with the electronic cassette 10.

The image capturing controller 28 sends the image capturing conditions to the electronic cassette 10 in order to set signal processing conditions in the electronic cassette 10, for example, in order to set the gain of an integrating amplifier for amplifying a voltage depending on signal charges converted from the radiation 24 by the FPD 34. The image capturing controller 28 also receives from the radiation generator 14 a synchronizing signal for synchronizing the irradiation timing of the radiation source 18 with an action for storing signal charges in the electronic cassette 10. In addition, the image capturing controller 28 sends the received synchronizing signal to the electronic cassette 10 for thereby controlling the radiation source 18 and the electronic cassette 10 to operate in synchronism with each other. The image capturing controller 28 receives image information from the electronic cassette 10, and sends the received image information to the console 30.

The console 30 accepts an inspection order including information concerning the gender, age, imaged region, and imaging purpose, etc., of the subject 44, typically a patient, and displays the accepted inspection order on a display monitor of the console 30. The inspection order is input from an external system such as a hospital information system (HIS) or a radiologic information system (RIS) that manages patient information and inspection information concerning a radiological inspection. Alternatively, the inspection order may be input manually by an operator who operates the console 30. The operator confirms the details of the inspection order on the display monitor, and selects image capturing conditions based on the confirmed details through an interactive screen on the display monitor. The console 30 sends the selected image capturing conditions to the image capturing controller 28.

The console 30 performs a prescribed image processing routine on the image information received from the image capturing controller 28. The processed image information is displayed on the display monitor of the console 30. The image information also is stored in a data storage device, such as a hard disk or a memory in the console 30, or an image storage server that is connected to the console 30 through a network.

In case that it is desired to capture a radiographic image of a certain region, e.g., a hand, a foot, or the like, of the subject 44, which cannot easily be imaged while the electronic cassette 10 is mounted on the image capturing stand 26, then as shown in FIG. 2, the electronic cassette 10 may be removed from the image capturing stand 26. For example, in case that a radiographic image of a hand of the subject 44 is to be captured, the electronic cassette 10 is removed from the image capturing stand 26 and is placed on a bed or a table with the front face 36 of the electronic cassette 10 oriented upwardly. Then, the hand is placed in a substantially central location on the top plate 42, after which a radiographic image of the hand is captured.

As shown in FIG. 3, the FPD 34 includes a detection panel 50 having a detection surface 48, which is composed of a pixel array made up of pixels 46 for storing signal charges depending on an applied dose of radiation 24, a gate driver 52 for energizing the pixels 46 to control reading of signal charges from the pixels 46, a signal processing circuit 54 for converging the signal charges that are read from the pixels 46 into image information in the form of digital data and outputting image information, a control circuit 56 for controlling the gate driver 52 and the signal processing circuit 54 in order to control operations of the FPD 34, and a communication circuit 57 that outputs image information from the electronic cassette 10.

The pixels 46 are arranged in a two-dimensional matrix having G1 through Gn (horizontal rows)×D1 though Dm (vertical columns), which are spaced at prescribed pitches. In FIG. 3, the gate driver 52 and the signal processing circuit 54 are illustrated in a simplified manner.

The FPD 34 comprises an indirect-conversion radiation detector for converting radiation 24 into visible light, photoelectrically converting the visible light into signal charges, and storing the signal charges. In other words, the detection panel 50 comprises a photoelectric transducer panel for converging visible light into signal charges by way of the pixels 46. A scintillator 58 (see FIGS. 6 and 7), which converts radiation 24 into visible light, is disposed on the detection surface 48 of the detection panel 50. The scintillator 58 is made of a phosphor such as cesium iodide (CsI), gadolinium oxysulfide (GOS), or the like. The scintillator 58 is formed by bonding a sheet that is coated with a phosphor to a support with an adhesive, or by evaporating a phosphor onto the detection surface 48.

The detection surface 48 is of a rectangular shape having a half-size (383.5 mm×459.5 mm), and the top plate 42 also is of a rectangular shape that corresponds in size to the detection surface 48.

Each of the pixels 46 comprises a photodiode 60 that serves as a photoelectric transducer for generating and storing electric charges (electron-hole pairs) depending on visible light applied to the photodiode 60, and a thin-film transistor (TFT) 62 that serves as a switching element. The detection panel 50 includes a TFT active matrix substrate having an insulating substrate, such as a glass substrate, with the pixels 46 disposed thereon.

The photodiode 60 has a structure including a semiconductor layer (e.g., PIN type) such as an amorphous silicon (a-Si) layer, and an upper electrode and a lower electrode, which are disposed respectively on upper and lower surfaces of the semiconductor layer. The TFT 62 is connected to the lower electrode of the photodiode 60, whereas a bias line 64 is connected to the upper electrode. A bias power supply 66 applies a bias voltage through the bias line 64 to the photodiode 60. In case that the bias voltage is applied, an electric field is developed in the semiconductor layer, thereby causing the electric charges (electron-hole pairs) generated in the semiconductor layer by photoelectric conversion to move to the upper and lower electrodes, one of which is of a positive polarity and the other of which is of a negative polarity. As a result, the photodiode 60 stores the electric charge.

The TFT 62 has a gate electrode connected to a scanning line 68, a source electrode connected to a signal line 70, and a drain electrode connected to the photodiode 60. In the detection surface 48, there are as many scanning lines 68 as the number of rows (n rows) of pixels 46. Each of the scanning lines 68 is shared by one row of pixels 46. There are also as many signal lines 70 as the number of columns (m columns) of pixels 46. Each of the signal lines 70 is shared by one column of pixels 46. The scanning lines 68 and the signal lines 70 are arranged in a grid pattern. The scanning lines 68 are connected to the gate driver 52, whereas the signal lines 70 are connected to a reading circuit 72 in the signal processing circuit 54.

The gate driver 52 is controlled by the control circuit 56 to energize and de-energize the TFTs 62 such that the detection panel 50 operates selectively in different modes. The different modes include a storing mode for storing signal charges depending on the dose of radiation 24 having reached the FPD 34 in the photodiodes 60, a reading mode for reading the signal charges stored in the photodiodes 60, and a resetting mode for flushing out unwanted charges stored in the photodiodes 60.

In the storing mode, the TFTs 62 are turned off or de-energized, and signal charges are stored in the photodiodes 60 while the TFTs 62 are de-energized. In the reading mode, the gate driver 52 generates gate pulses G1 through Gn successively at prescribed intervals for energizing the TFTs 62 simultaneously along the respective rows, thereby activating the scanning lines 68 one at a time, and hence turning on the TFTs 62 connected to the scanning lines 68 one row at a time. In case that the TFTs 62 are turned on, the signal charges stored in the photodiodes 60 are read into the signal lines 70, from which the signal charges are input to the signal processing circuit 54.

The signal processing circuit 54 has the reading circuit 72, which includes integrating amplifiers, CDS circuits, a multiplexer, and an A/D converter 74. The integrating amplifiers and the CDS circuits are connected individually to the signal lines 70. The integrating amplifiers integrate signal charges that are input from the signal lines 70, convert the integrated signal charges into analog voltage signals, and output the analog voltage signals. The CDS circuits perform correlative double sampling on the voltage signals from the integrating amplifiers, and hold the voltage signals for a prescribed period of time. Using electronic switches, the multiplexer selects the CDS circuits one at a time. The CDS circuits are assigned respectively to the columns and are connected in parallel to each other, and the multiplexer inputs voltage signals, which are output from selected CDS circuits, in a serial stream to the A/D converter 74. The A/D converter 74 converts the analog voltage signals, which are input from the multiplexer, into digital pixel values, and outputs the digital pixel values to the memory 76. The memory 76 stores the digital pixel values in association with respective coordinates of the pixels 46.

Therefore, each time that the gate driver 52 supplies one of the gate pulses G1 through Gn in order to turn on a corresponding row of TFTs 62, the memory 76 stores the pixel values from one row of pixels 46. After the signal charges from all of the rows of pixels 46 have been read out from the detection panel 50, the memory 76 stores image information representing a single radiographic image captured by the detection panel 50. The image information is read out of the memory 76, processed by the control circuit 56 according to prescribed image processing sequences, and thereafter, the image information is output to the image capturing controller 28 through the communication circuit 57. In this manner, a radiographic image of the patient is detected.

Internal structural details of the casing 32 will be described below with reference to FIGS. 4 through 6.

Figure 6:
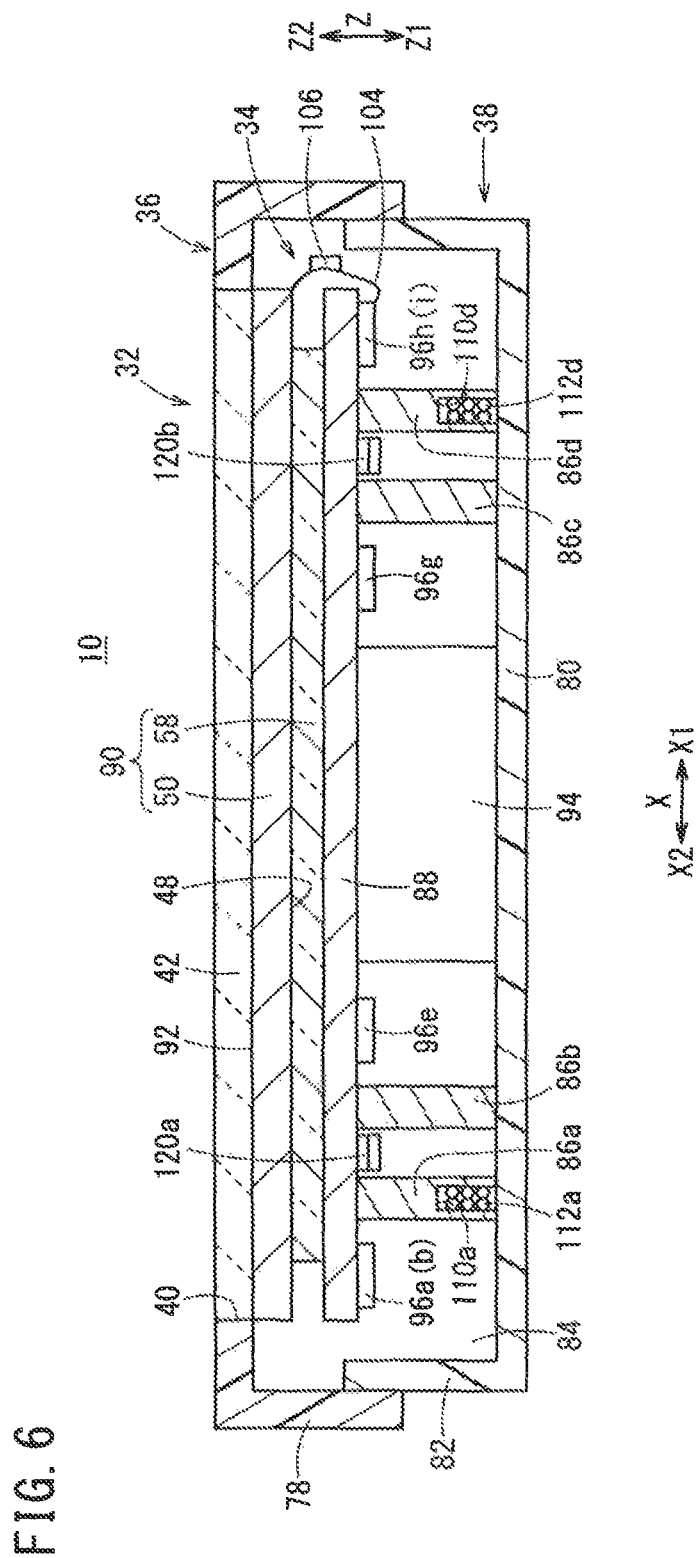
FIG. 6 is a cross-sectional view taken along line VI-VI of FIGS. 2 and 5.

As shown in FIG. 6, the front face 36 of the casing 32 serves as a lid having sides 78 that extend in the direction of the arrow Z1, whereas the rear face 38 of the casing 32 has a bottom plate 80, and sides 82 that extend from ends of the bottom plate 80 in the direction of the arrow Z2. The front face 36 is fitted over the rear face 38, such that the sides 82 of the rear face 38 are positioned inside of the sides 78 of the front face 36. Accordingly, in the interior of the casing 32, a storage space 84 is produced in which the FPD 34, etc., is accommodated.

A metal base plate 88 is supported in the storage space 84 by a plurality of spacers 86a through 86d, which are erected as support members from the bottom plate 80. Each of the spacers 86a through 86d is made of or contains an electrically conductive material, such as a metal, an electrically conductive resin, or the like, and is fixed to the base plate 88. A radiation conversion panel 90, which includes the detection panel 50 and the scintillator 58 stacked together in the direction of the arrow Z, is disposed between the base plate 88 and the top plate 42. The spacers 86a through 86d support the base plate 88 and the radiation conversion panel 90.

According to the present embodiment, at least the radiation conversion panel 90 may be supported in the casing 32 by the spacers 86a through 86d that are erected from the bottom plate 80. Therefore, as shown in FIG. 6, the radiation conversion panel 90 may be supported by the spacers 86a through 86d with the base plate 88 interposed therebetween. Alternatively, the radiation conversion panel 90 may be supported directly by the spacers 86a through 86d, provided that the base plate 88 is not housed in the casing 32.

As shown in FIG. 6, the radiation conversion panel 90 is an irradiation-side-sampling (ISS) radiation conversion panel, in which the detection panel 50 and the scintillator 58 are successively arranged in this order as viewed from the top plate 42 that is irradiated with radiation 24. The detection panel 50, the upper surface of which serves as an irradiation surface 92 that is irradiated with radiation 24, is attached to the bottom surface of the top plate 42 by an adhesive or the like. The detection surface 48, which is formed by the bottom surface of the detection panel 50, faces the rear face 38 in opposing relation to the scintillator 58. The scintillator 58 has a bottom surface, which is attached to the base plate 88 by an adhesive or the like.

According to the present embodiment, the radiation conversion panel 90 may be a penetration-side-sampling (PSS) radiation conversion panel, in which the scintillator 58 and the detection panel 50 are successively arranged in this order as viewed from the top plate 42 that is irradiated with radiation 24. Further, alternatively, the radiation conversion panel 90 may be a direct-conversion radiation conversion panel, which incorporates a transducer layer of amorphous selenium or the like for directly converting radiation 24 into electric charges.

Figure 5:
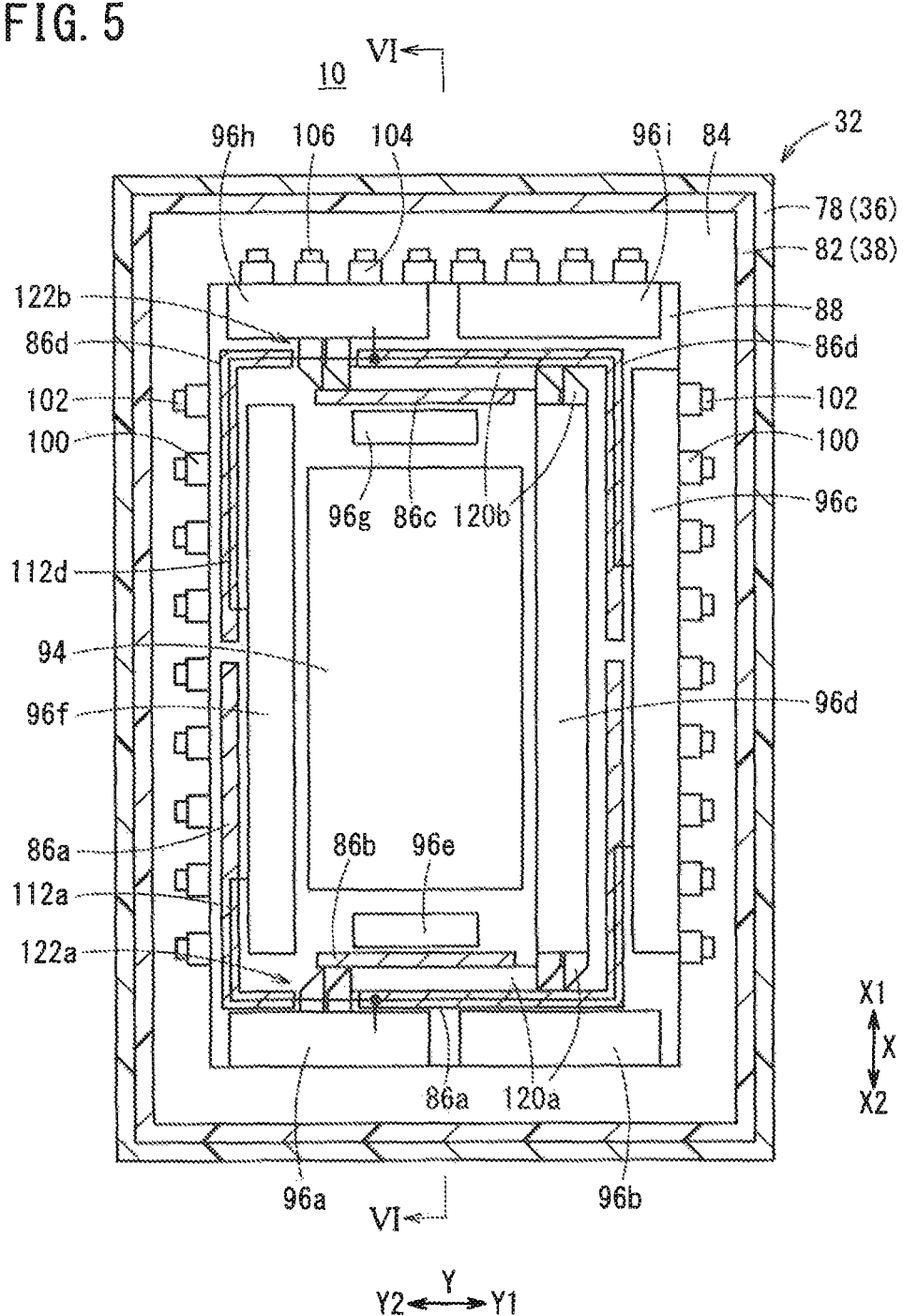
FIG. 5 is a cross-sectional view taken along line V-V of FIG. 2.

As shown in FIGS. 5 and 6, in the storage space 84, a battery 94 for supplying electric power to various components of the electronic cassette 10 is disposed between a central area of the bottom surface of the base plate 88 and a central area of the bottom plate 80. A plurality of circuit boards 96a through 96i are fixed to the bottom surface of the base plate 88 in surrounding relation to the battery 94. The circuit boards 96a through 96i support non-illustrated circuit parts, which function respectively as the gate driver 52, the signal processing circuit 54, the control circuit 56, the communication circuit 57, and the memory 76.

As shown in FIGS. 4 through 6, a plurality of flexible boards 100, which supply gate pulses for energizing the TFTs 62 to the detection panel 50 of the radiation conversion panel 90, are disposed at prescribed intervals on side surfaces of the detection panel 50 that face in the directions of the arrows Y1 and Y2. For generating the gate pulses, each of the flexible boards 100 supports a gate driver IC chip 102 of the gate driver 52. The flexible boards 100 include portions of the scanning lines 68.

A plurality of flexible boards 104, which read signal charges, and are constructed to include portions of the signal lines 70, are disposed at prescribed intervals on a side surface of the detection panel 50 that faces in the direction of the arrow X1. Each of the flexible boards 104 supports a readout IC chip 106, which serves as a portion of the signal processing circuit 54.

The flexible boards 100, 104 are connected to the circuit boards 96a through 96i that are fixed to the bottom surface of the base plate 88.

Layout of Wires in the Electronic Cassette

As shown in FIG. 5, the spacer 86a is formed substantially in a U-shape as viewed in plan, and the spacer 86a extends along the circuit boards 96a through 96f. The spacer 86b is disposed between the spacer 86a and the circuit board 96e. The spacer 86c is disposed between the circuit board 96g and the spacer 86d. The spacer 86d is formed substantially in a U-shape as viewed in plan, and the spacer 86d extends along the circuit boards 96c, 96d, 96f through 96i.

According to the present embodiment, as shown in FIGS. 6 through 10B, the spacers 86a, 86d have slots 110a, 110d defined respectively therein, which extend along the longitudinal directions of the spacers 86a, 86d. Wire harnesses 112a, 112d are housed respectively in the slots 110a, 110d. Each of the wire harnesses 112a, 112d is in the form of a bundle of conductive wires, each of which is coated with an insulating layer.

The wire harness 112a, which is housed in the slot 110a, connects the circuit board 96c and the circuit boards 96a, 96f to each other. Therefore, via the wire harness 112a, it is possible for the circuit board 96c and the circuit boards 96a, 96f to send various signals to and receive various signals from each other.

The wire harness 112d, which is housed in the slot 110d, connects the circuit board 96c and the circuit boards 96f, 96h to each other. Therefore, via the wire harness 112d, it is possible for the circuit board 96c and the circuit boards 96f, 96h to send various signals to and receive various signals from each other.

In FIGS. 5 and 6, a case is illustrated by way of example, in which the spacers 86a, 86d have the slots 110a, 110d defined therein, respectively, and the wire harnesses 112a, 112d are housed respectively in the slots 110a, 110d. However, the present embodiment is not limited to the illustrated structure. Alternatively, the spacers 86a through 86d may have slots defined respectively therein, with wire harnesses housed in the slots that serve to interconnect the circuit boards 96a through 96i for sending and receiving signals therebetween. Furthermore, the spacers 86a through 86d may have slots defined respectively therein, with wire harnesses housed in the slots, which are connected to the flexible boards 100, 104 for sending and receiving signals between the detection panel 50 and the circuit boards 96a through 96i.

In FIGS. 5 and 6, the slots 110a, 110d are defined in the spacers 86a, 86d, so as to open on sides of the spacers 86a, 86d proximate the rear face 38. However, the slots 110a, 110d may be defined in the spacers 86a, 86d, so as to open on sides of the spacers 86a, 86d proximate the front face 36. The spacers 86b, 86c may also have slots defined therein, which open respectively on the sides thereof proximate the front face 36 or the rear face 38.

Figure 7:
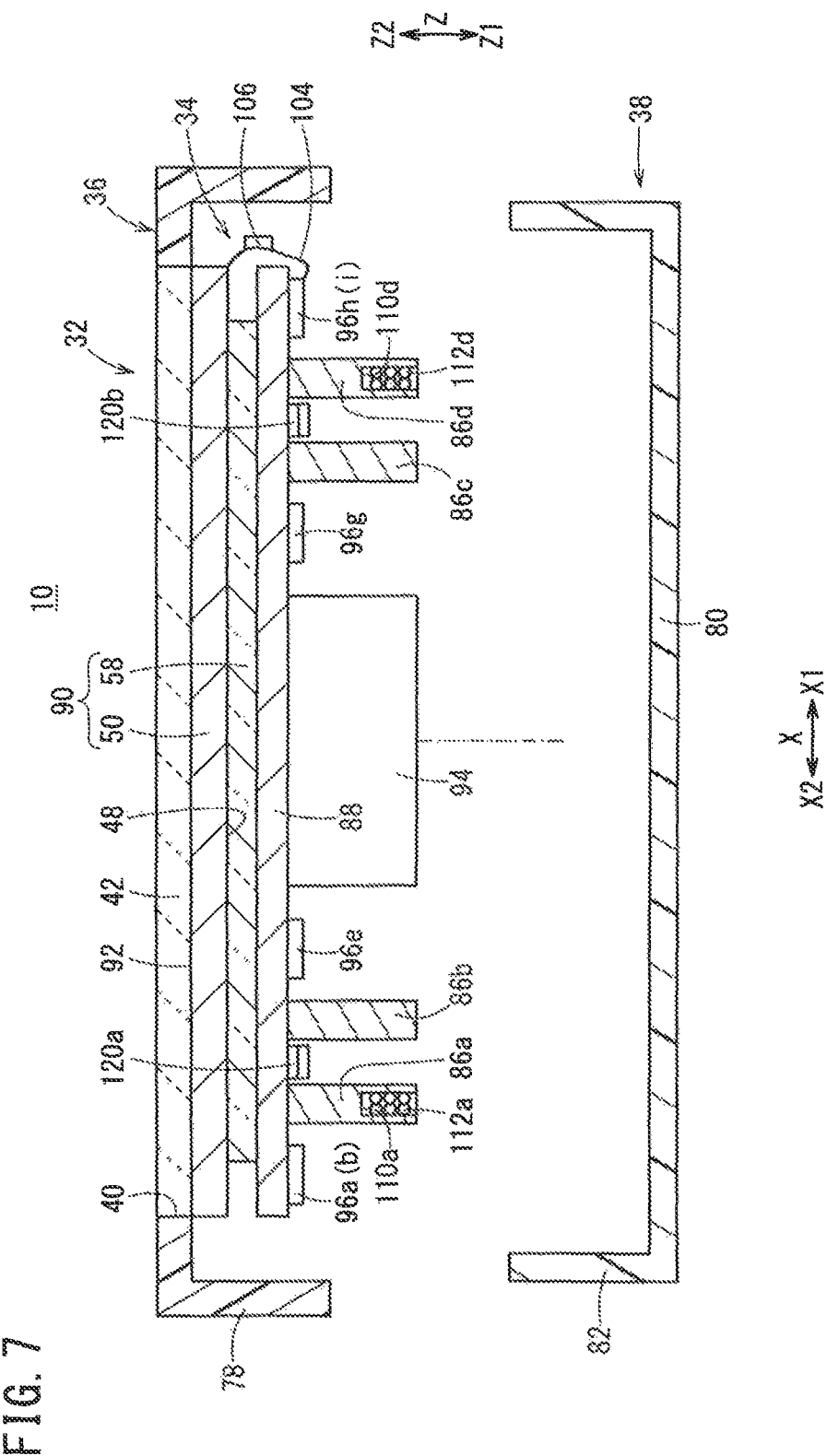
FIG. 7 is a cross-sectional view showing a casing before the casing is assembled.
Figure 8:
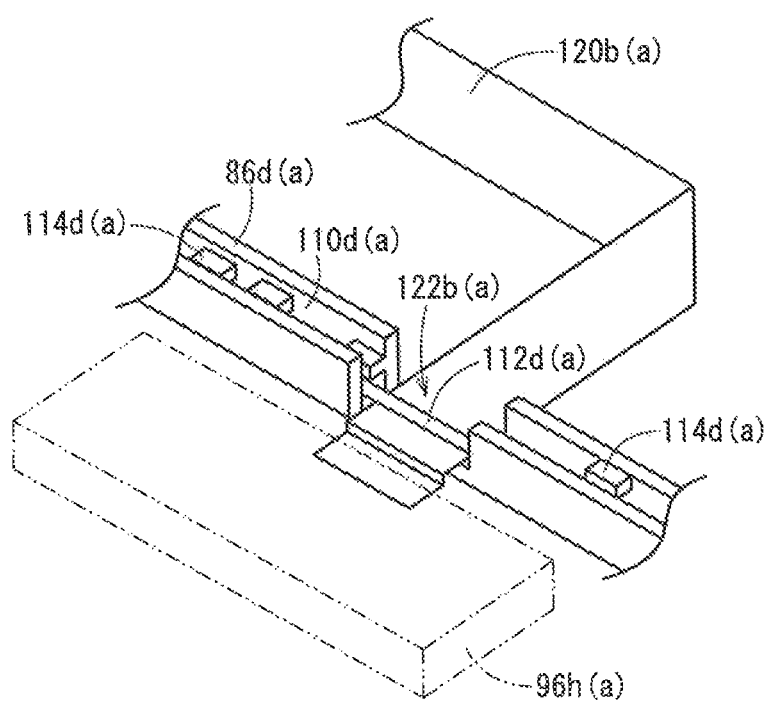
FIG. 8 is an enlarged perspective view showing a manner in which a wire harness and a flexible cable extend across one another.

In FIGS. 6 through 8, a case is illustrated by way of example, in which the spacers 86a, 86d are made of the same material, and the slots 110a, 110d having side walls and bottoms are formed integrally in the spacers 86a, 86d by opening on sides of the spacers 86a, 86d proximate the rear face 38. However, the present embodiment is not limited to the illustrated structure. Instead, the slot structures need not be formed in the spacers 86a through 86d, but rather, slot structures may be provided by the spacers 86a through 86d, which serve as side walls, and the bottom plate 80 or the base plate 88, which serves as a bottom. In the following description below, slots 110a, 110d that are defined in the spacers 86a, 86d will be described.

Structural details of the slots 110a, 110d will be described below.

As shown in FIGS. 8 through 10B, the spacers 86a, 86d have respective teeth 114a, 114d, which are made of an elastic material such as resin, rubber, or the like, and are disposed at inlet ends of the slots 110a, 110d in the direction of the arrow Z1. The teeth 114a, 114d are provided as a plurality of teeth, which are spaced at prescribed intervals along the longitudinal directions of the spacers 86a, 86d. The teeth 114a, 114d are disposed in a staggered layout along the longitudinal directions of the spacers 86a, 86d.

As shown in FIGS. 9B through 10B, at least portions of the teeth 114a, 114d, which are disposed near the wire harnesses 112a, 112d, or more specifically, the corners of the teeth 114a, 114d that may come into contact with the wire harnesses 112a, 112d, are rounded as viewed in cross section along a plane normal to the longitudinal directions of the spacers 86a, 86d.

Figure 9A:
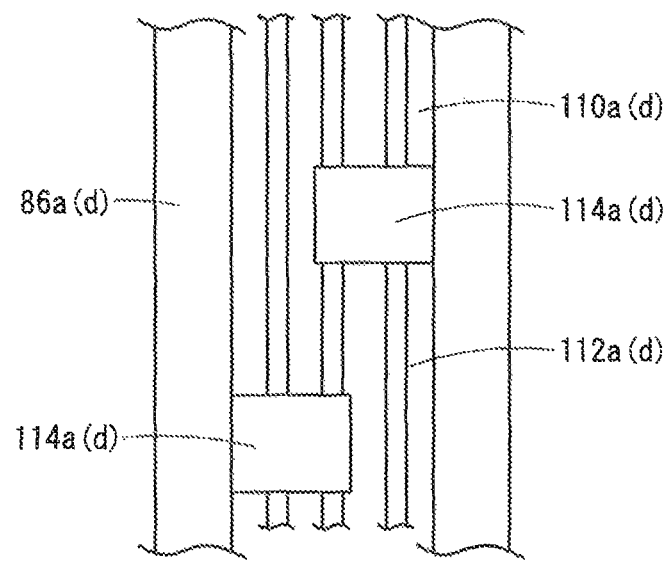
FIG. 9A is a fragmentary plan showing a staggered layout of teeth.
Figure 9B:
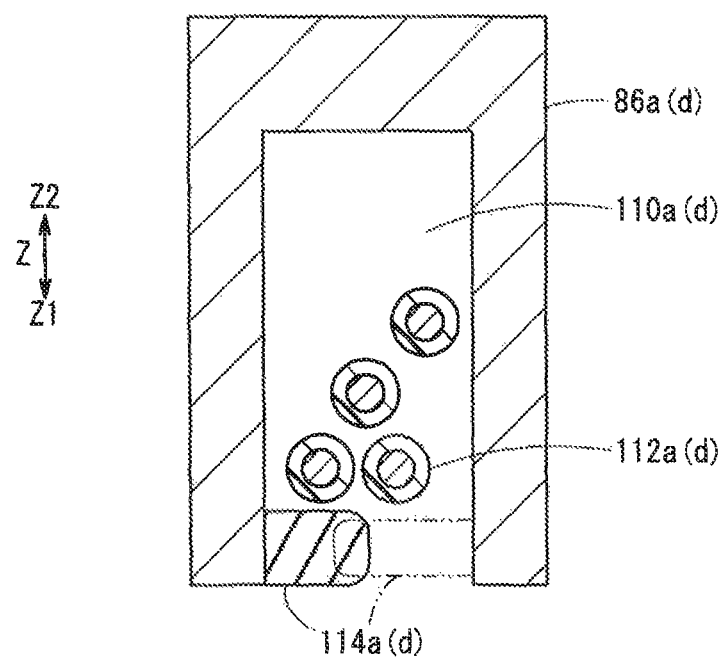
FIG. 9B is a cross-sectional view of wire harnesses that are housed in a slot.
Figure 10A:
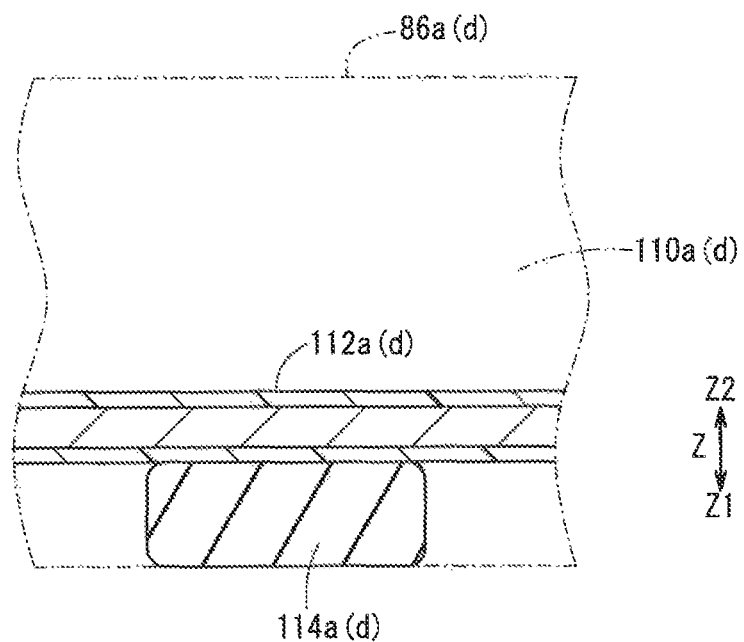
FIGS. 10A and 10B are cross-sectional views of teeth.
Figure 10B:
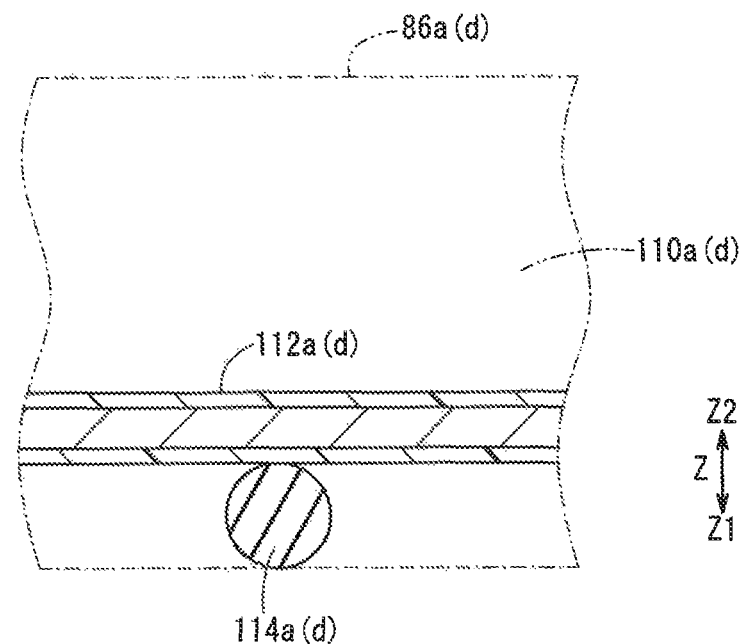

As shown in FIGS. 9B and 10A, among the corners of the teeth 114a, 114d, the corners that may come into contact with the wire harnesses 112a, 112d and face in the direction of the arrow Z2, and the corners that do not come into contact with the wire harnesses 112a, 112d and face in the direction of the arrow Z1 are beveled in rounded shapes. According to the present embodiment, at least the corners of the teeth 114a, 114d that may come into contact with the wire harnesses 112a, 112d, i.e., the corners that face in the direction of the arrow Z2 in FIGS. 9B and 10A, may be rounded. Therefore, as shown in FIG. 10B, the teeth 114a, 114d may have a circular cross-sectional shape.

The teeth 114a, 114d hold the wire harnesses 112a, 112d reliably within the slots 110a, 110d, thus making it less likely for the wire harnesses 112a, 112d to become dislodged from the slots 110a, 110d. Consequently, in case that the components, which are stored in the storage space 84, are provided on the front face 36, and the front face 36 and the rear face 38 are interfitted to form the casing 32, as shown in FIG. 7, the wire harnesses 112a, 112d are prevented from becoming dislodged and hanging down from the slots 110a, 110d.

The corners of the teeth 114a, 114d, which come into contact with the wire harnesses 112a, 112d and face in the direction of the arrow Z2, are rounded. Thus, the wire harnesses 112a, 112d are effectively prevented from becoming damaged.

As shown in FIG. 5, the circuit boards 96a, 96d are connected to each other by a plurality of flexible cables 120a, which are laid out along a gap between the spacers 86a, 86b. In addition, the circuit boards 96d, 96h are connected to each other by a plurality of flexible cables 120b, which are laid out along a gap between the spacers 86c, 86d. As shown in FIGS. 5 and 8, the side walls of the spacers 86a, 86d, which define the slots 110a, 110d, are partially removed near the circuit boards 96a, 96h, thereby providing crossing regions 122a, 122b where the wire harnesses 112a, 112d, serving as wires, and the flexible cables 120a, 120b, serving as other wires, extend across each other.

FIG. 8 shows a conceptual representation of only one of the flexible cables 120a, 120b for facilitating understanding of the crossing regions 122a, 122b. The crossing section shown in FIG. 8 is applicable to the arrangement shown in FIG. 5, in which a plurality of flexible cables 120a, 120b exist.

As described above, the wire harnesses 112a, 112d are securely retained in the slots 110a, 110d by the teeth 114a, 114d, and are prevented from becoming dislodged from the slots 110a, 110d. In the case where the flexible cables 120a, 120b are laid out along the base plate 88 between the circuit board 96d and the circuit boards 96a, 96h, the wire harnesses 112a, 112d and the flexible cables 120a, 120b extend across each other in the crossing regions 122a, 122b, and are superposed on one another in the order of the flexible cables 120a, 120b and the wire harnesses 112a, 112d with respect to the base plate 88.

Consequently, the flexible cables 120a, 120b are held against the base plate 88 by the wire harnesses 112a, 112d, which are securely retained in the slots 110a, 110d. Thus, the flexible cables 120a, 120b are prevented from floating upwardly off from the base plate 88.

Advantages of the Embodiment

As described above, with the electronic cassette 10 according to the present embodiment, the wire harnesses 112a, 112d are housed in the slots 110a, 110d, which are defined as gaps in the spacers 86a, 86d. The spacers 86a, 86d serve to support the radiation conversion panel 90 and the base plate 88 in the storage space 84 in the casing 32, and also bear an external load applied thereto, e.g., a pressure exerted from the body of the subject 44. Since the wire harnesses 112a, 112d are housed in the slots 110a, 110d, even in case that the casing 32 is deformed under external forces, the passageways for the wire harnesses 112a, 112d are prevented from becoming narrowed, and the wire harnesses 112a, 112d are prevented from being deformed. Thus, the wire harnesses 112a, 112d that are housed in the slots 110a, 110d are prevented from becoming broken or disconnected, even in case that subjected to external loads and/or vibrations.

Further, since the wire harnesses 112a, 112d are housed in the slots 110a, 110d, members for clamping the wire harnesses 112a, 112d are not required. As a result, the slots 110a, 110d allow the wire harnesses 112a, 112d to be laid out with ease, and are effective in conserving space.

With the various circuit boards 96a through 96i, which are fixed to the base plate 88 in the storage space 84, the wire harnesses 112a, 112d are capable of interconnecting the circuit board 96c and the circuit boards 96a, 96f, 96h via the slots 110a, 110d.

The teeth 114a, 114d, which are disposed in the spacers 86a, 86d for holding the wire harnesses 112a, 112d in the slots 110a, 110d, make it unnecessary to use fixing parts, including clamps, tapes, etc., and make it less costly to secure the wire harnesses 112a, 112d, since the number of locations where the wire harnesses 112a, 112d are fixed is reduced.

Since the teeth 114a, 114d are made of an elastic material such as resin, rubber, or the like, the teeth 114a, 114d do not damage the wire harnesses 112a, 112d that are housed in the slots 110a, 110d. In case that at least the corners of the teeth 114a, 114d, which are positioned near the wire harnesses 112a, 112d, are rounded as viewed in cross section along a plane normal to the longitudinal directions of the spacers 86a, 86d in FIGS. 9B through 10B, then the wire harnesses 112a, 112d are effectively prevented from becoming damaged.

Since the teeth 114a, 114d are disposed in a staggered layout along the longitudinal directions of the spacers 86a, 86d in the slots 110a, 110d, which are defined longitudinally in the spacers 86a, 86d, it is less likely for the wire harnesses 112a, 112d to become dislodged from the slots 110a, 110d.

The spacers 86a, 86d, which are made of or contain an electrically conductive material, exhibit a shielding effect on the wire harnesses 112a, 112d that are housed in the slots 110a, 110d. More specifically, generation of noise is avoided in the case where the wire harnesses 112a, 112d, which are housed in the slots 110a, 110d, are vibrated. The shielding effect exhibited by the spacers 86a, 86d is effective to prevent noise from external electronic devices from being applied to the wire harnesses 112a, 112d.

The side walls of the spacers 86a, 86d, which define the slots 110a, 110d, are partially removed in order to provide the crossing regions 122a, 122b where the wire harnesses 112a, 112d and the flexible cables 120a, 120b, which define other wires, extend across each other. Thus, the flexible cables 120a, 120b are held between the wire harnesses 112a, 112d and the base plate 88.

Since the spacers 86a through 86d and the circuit boards 96a through 96i are fixed to the same front face 36, the wire harnesses 112a, 112d can easily be connected to the circuit boards 96a through 96i.

In the above description, a case has been described in which the circuit board 96c and the circuit boards 96a, 96f, 96h are interconnected by the wire harnesses 112a, 112d, and more specifically, as one example, a case has been described in which the plural circuit boards 96a, 96c, 96f, 96h are interconnected by the wire harnesses 112a, 112d. According to the present embodiment, a case can also be applied in which a region and another region of one of the circuit boards 96a through 96i are interconnected by a wire harness.

In the above description, furthermore, the teeth 114a, 114d, which are separate from the spacers 86a, 86d, are disposed in the slots 110a, 110d. According to the present invention, the spacers 86a, 86d and the teeth 114a, 114d may be made of the same material. In this case, in case that the spacers 86a, 86d and the teeth 114a, 114d are made of metal, the surfaces of the teeth 114a, 114d preferably are covered with caps made of rubber, resin, or the like, in order to prevent damage from occurring to the wire harnesses 112a, 112d. Alternatively, the spacers 86a, 86d and the teeth 114a, 114d may be formed integrally from an electrically conductive and elastic rubber, resin, or the like.

In the above description, moreover, the teeth 114a, 114d are disposed in a staggered layout along the longitudinal directions of the spacers 86a, 86d in the slots 110a, 110d. However, instead of the teeth 114a, 114d, lids may be used to cover the inlet ends of the slots 110a, 110d. Such lids are effective to prevent the wire harnesses 112a, 112d from becoming dislodged from the slots 110a, 110d.

Modifications of the Embodiment

Figure 11:
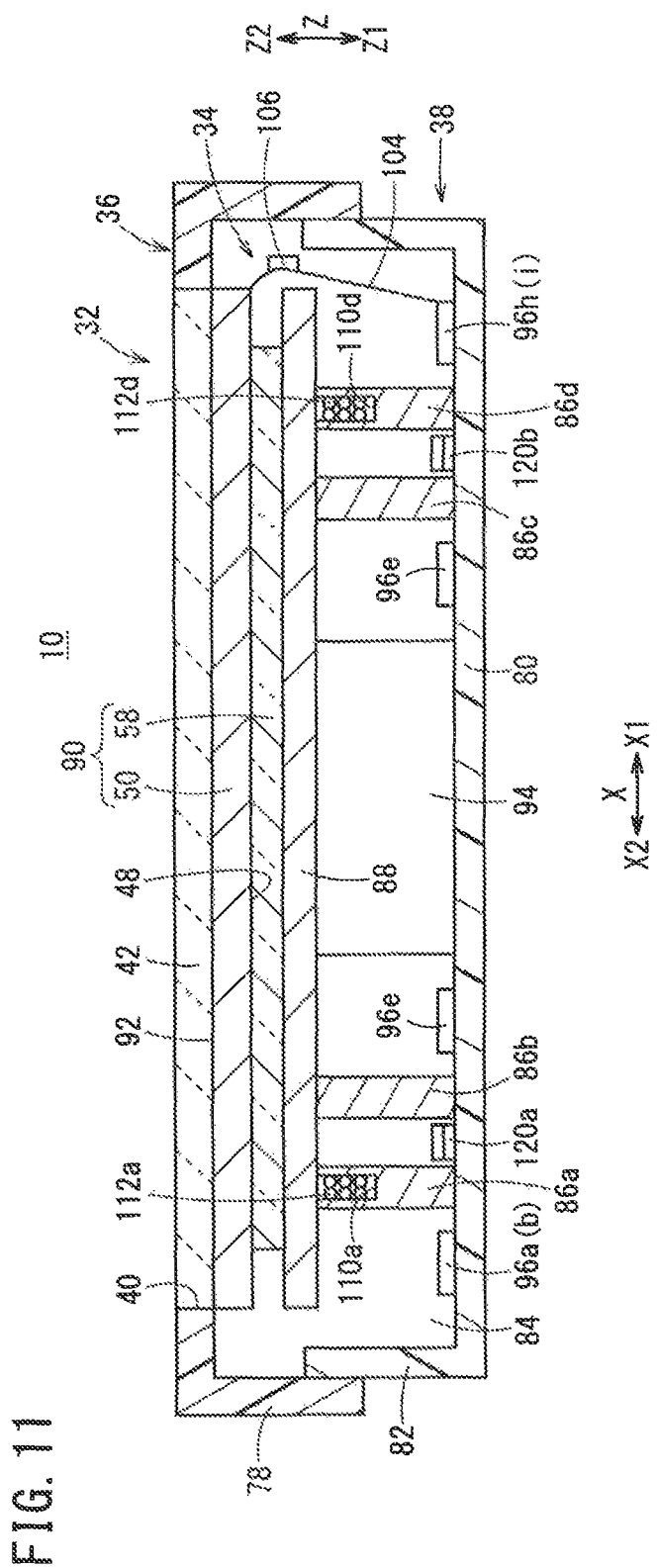
FIG. 11 is a cross-sectional view taken along line XI-XI of FIG. 2, showing a modification of the embodiment.

The electronic cassette 10 according to the present embodiment is not limited to the above-described structural details. The electronic cassette 10 may be modified according to the modification shown in FIG. 11.

According to the modification, the spacers 86*a* through 86*d*, the battery 94, the circuit boards 96*a* through 96*i*, and the flexible cables 120*a*, 120*b* are disposed on the bottom plate 80 of the rear face 38. More specifically, according to the modification shown in FIG. 11, the spacers 86*a* through 86*d*, the battery 94, the circuit boards 96*a* through 96*i*, and the flexible cables 120*a*, 120*b*, which are disposed on the base plate 88 as shown in FIGS. 6 and 7, are turned upside down and then placed on the bottom plate 80. As a result, the spacers 86*a* through 86*d*, the battery 94, and the circuit boards 96*a* through 96*i* are fixed to the bottom plate 80.

Since according to the modification, the spacers 86*a* through 86*d* and the circuit boards 96*a* through 96*i* are disposed on the same rear face 38, it is easy for the wire harnesses 112*a*, 112*d* to be connected to the circuit boards 96*a* through 96*i*. Further, according to the modification, the flexible cables 120*a*, 120*b* are held in position between the wire harnesses 112*a*, 112*d* and the bottom plate 80.

Although the preferred embodiment and the aforementioned modification have been described above, it should be understood that the present invention is not limited to the illustrated embodiment and the modification, but various changes may be made thereto without departing from the scope of the invention as set forth in the appended claims.

What is claimed is:

1. A portable radiographic image capturing apparatus, comprising:
    a radiation conversion panel provided on a base plate and configured to output image information based on applied radiation;
    a casing housing the radiation conversion panel therein; and
    a plurality of support members on which the radiation conversion panel is supported in the casing,
    wherein the support members have slot structures housing wires therein,
    further comprising:
    a plurality of boards housed in the casing,
    the base plate, and
    a battery,
    wherein the wires are connected to regions of the boards, and the wires are connected through the slot structures to other regions of the boards or to the radiation conversion panel,
    in the casing, the radiation conversion panel is supported, via the base plate and the support members, by a rear face of the casing that faces a front face that is irradiated with the radiation,
    between a central area of a bottom surface of the base plate and a central area of the rear face of the casing, in plan view, the battery is placed at a central part of the base plate in a manner so that between the plurality of support members, the battery is in contact with the base plate and the rear face,
    the plurality of boards are fixed to the bottom surface of the base plate or to a bottom plate of the casing in a manner so that the plurality of boards surrounds the battery, and the support members being wall-like are disposed surrounding the battery,
    the plurality of support members includes a first support member and a second support member that are disposed in a U-shape along the boards, and
    the slot structures are formed along longitudinal directions of the first and second support members.
2. The portable radiographic image capturing apparatus according to claim 1, further comprising:
    a plurality of teeth disposed in the support members and holding the wires within the slot structures.
3. The portable radiographic image capturing apparatus according to claim 2, wherein the teeth have respective surfaces made of an elastic material.
4. The portable radiographic image capturing apparatus according to claim 2, wherein the teeth include at least corners, which are positioned near the wires, and are rounded as viewed in cross section along a plane normal to the longitudinal directions.
5. The portable radiographic image capturing apparatus according to claim 2, wherein:
    the slot structures extend along the longitudinal directions; and
    the teeth are disposed in a staggered layout along the longitudinal directions.
6. The portable radiographic image capturing apparatus according to claim 1, wherein the support members are made of or contain an electrically conductive material.
7. The portable radiographic image capturing apparatus according to claim 1, wherein:
    the slot structures include crossing regions where other wires extend across the wires; and
    the crossing regions are provided by partially removing side walls of the support members that define the slot structures.
8. The portable radiographic image capturing apparatus according to claim 7, wherein:
    the other wires extend across both the slot structures and the wires that are housed in the slot structures in the crossing regions; and
    the other wires are held between the wires, which are housed in the slot structures, and the casing or the base plate.
9. The portable radiographic image capturing apparatus according to claim 1, wherein:
    the radiation conversion panel is fixed to the front face, and the rear face is held in fitted engagement with the front face;
    the radiation conversion panel and the base plate are supported in the casing by the support members, which are erected from the rear face; and
    the boards and the support members are fixed to the front face by the base plate.
10. The portable radiographic image capturing apparatus according to claim 1, wherein:
    t the radiation conversion panel is fixed to the front face, and the rear face is held in fitted engagement with the front face;
    the radiation conversion panel and the base plate are supported in the casing by the support members, which are erected from the rear face; and
    the boards and the support members are fixed to the rear face.
11. A portable radiographic image capturing apparatus, comprising:
    a radiation conversion panel provided on a base plate and configured to output image information based on applied radiation;
    a casing housing the radiation conversion panel therein; and
    a support member on which the radiation conversion panel is supported in the casing;
    the base plate, a battery, and a board accommodated in the casing;
    wherein in the casing, the radiation conversion panel is supported, via the base plate and the support members, by a rear face of the casing that faces a front face that is irradiated with the radiation, the support member includes a first side wall and a second side wall that is disposed facing the first side wall, teeth are alternatively disposed on the first side wall and the second side wall along a longitudinal direction of the support member, wires are connected to regions of the board, the wires are connected, running between the first side wall and the second side wall, to other regions of the board or to the radiation conversion panel, and between a central area of a bottom surface of the base plate and a central area of the rear face of the casing, in plan view, the battery is placed in a manner so that between the plurality of support members, the battery is in contact with the base plate and the rear face, the plurality of boards are fixed to the bottom surface of the base plate or to a bottom plate of the casing in a manner so that the plurality of boards surrounds the battery, and the support members being wall-like are disposed surrounding the battery, the plurality of support members includes a first support member and a second support member that are disposed in a U-shape along the boards, and the slot structures are formed along longitudinal directions of the first and second support members.

* * * * *